(12) United States Patent
Methani et al.

(10) Patent No.: US 11,157,539 B2
(45) Date of Patent: Oct. 26, 2021

(54) TOPIC SET REFINEMENT

(71) Applicant: Microsoft Technology Licensing, LLC, Redmond, WA (US)

(72) Inventors: Chhaya Methani, Bellevue, WA (US); Mayank Shrivastava, Bellevue, WA (US); Pushpraj Shukla, Dublin, CA (US); Jonas Barklund, Seattle, WA (US); Dario Vignudelli, Bellevue, WA (US); Ipolitas Clinton Dunaravich, Seattle, WA (US); Hung-An Chang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 16/016,352

(22) Filed: Jun. 22, 2018

(65) Prior Publication Data
US 2019/0392078 A1    Dec. 26, 2019

(51) Int. Cl.
*G06F 16/35* (2019.01)
*G06F 16/31* (2019.01)
*G06F 16/33* (2019.01)

(52) U.S. Cl.
CPC .......... *G06F 16/353* (2019.01); *G06F 16/322* (2019.01); *G06F 16/3347* (2019.01)

(58) Field of Classification Search
USPC ........................................................ 707/740
See application file for complete search history.

(56) References Cited

U.S. PATENT DOCUMENTS

| | | |
|---|---|---|
| 6,446,061 B1 | 9/2002 | Doerre et al. |
| 7,426,507 B1 | 9/2008 | Patterson |
| 7,428,533 B2 | 9/2008 | Kapur et al. |
| 7,650,327 B2 | 1/2010 | Remsen et al. |
| 7,788,265 B2 | 8/2010 | Morscher et al. |
| 8,341,159 B2 | 12/2012 | Gates |
| 8,972,404 B1 * | 3/2015 | Lewis .................. G06F 16/355 707/737 |

(Continued)

FOREIGN PATENT DOCUMENTS

EP      3115907 A1     1/2017

OTHER PUBLICATIONS

"Web crawler", Retrieved From: http://web.archive.org/web/20180615203414/https://en.wikipedia.org/wiki/Web_crawler, Jun. 15, 2018, 15 Pages.

(Continued)

*Primary Examiner* — Muluemebet Gurmu
(74) *Attorney, Agent, or Firm* — Holzer Patel Drennan

(57) ABSTRACT

A computing system including one or more processors generates a topic set for a domain. A taxonomic evaluator is executed by the one or more processors to evaluate a set of category clusters generated from domain-specific textual data against a domain-specific taxonomic tree based on a coherency condition and to identify the category clusters that satisfy the coherency condition. The domain-specific taxonomic tree is generated from hierarchical structures of documents relating to the domain. Each identified category cluster is labeled with a label. A topic set creator is executed by the one or more processors to insert the labels of the set of identified category clusters into the topic set for the domain.

18 Claims, 7 Drawing Sheets

(56) References Cited

U.S. PATENT DOCUMENTS

| | | | |
|---|---|---|---|
| 9,110,984 | B1 | 8/2015 | Lewis et al. |
| 9,208,435 | B2 | 12/2015 | Zelevinsky |
| 9,501,569 | B2 | 11/2016 | Song et al. |
| 9,613,371 | B2 | 4/2017 | Subramanya et al. |
| 9,946,783 | B1 | 4/2018 | Lewis et al. |
| 2001/0037324 | A1* | 11/2001 | Agrawal ............... 707/999.001 |
| 2006/0004732 | A1 | 1/2006 | Odom |
| 2008/0143723 | A1 | 6/2008 | Zhou |
| 2011/0225159 | A1 | 9/2011 | Murray |
| 2011/0314011 | A1 | 12/2011 | Buehrer et al. |
| 2012/0317088 | A1* | 12/2012 | Pantel ..................... G06F 17/30 707/706 |
| 2014/0317074 | A1* | 10/2014 | Song ..................... G06F 16/951 707/706 |
| 2017/0293629 | A1 | 10/2017 | Doan et al. |
| 2018/0075074 | A1* | 3/2018 | Shimizu ................. G06F 17/30 |
| 2019/0392073 | A1 | 12/2019 | Gutierrez et al. |

OTHER PUBLICATIONS

"International Search Report and Written Opinion Issued in PCT Application No. PCT/US2019/037136", dated Aug. 27, 2019, 10 Pages.

Chernyak, et al., "Refining a Taxonomy by Using Annotated Suffix Trees and Wikipedia Resources", In Journal of Annals of Data Science, vol. 2, Issue 1, Mar. 2015, pp. 61-82.

Chuang, et al., "Automatic Query Taxonomy Generation for Information Retrieval Applications", In Journal of Online Information Review, vol. 27, Issue 4, Aug. 2003, 13 Pages.

Fernandez-Fernandez, et al., "Hierarchical Taxonomy Extraction by Mining Topical Query Sessions", In Proceedings of the International Conference on Knowledge Discovery and Information Retrieval, Oct. 6, 2009, 7 Pages.

He, et al., "Combining Implicit and Explicit Topic Representations for Result Diversification", In Proceedings of 35th International ACM SIGIR conference on research and development in Information Retrieval, Aug. 12, 2012, 11 Pages.

Ren, et al., "Heterogeneous Graph-Based Intent Learning with Queries, Web Pages and Wikipedia Concepts", In Proceedings of Seventh ACM International Conference on Web Search and Data Mining, Feb. 24, 2014, 10 Pages.

Sánchez, "Automatic Generation of Taxonomies from the WWW", In Proceedings of 5th International Conference on Practical Aspects of Knowledge Management, Dec. 2, 2004, 12 Pages.

Yin, et al., "Building Taxonomy of Web Search Intents for Name Entity Queries", In Proceedings of the 19th International Conference on World Wide Web, Apr. 26, 2010, pp. 1001-1010.

Zhao, et al., "Tailor knowledge graph for query understanding: linking intent topics by propagation", In Proceedings of the Conference on Empirical Methods in Natural Language Processing, Oct. 25, 2014, pp. 1070-1080.

"International Search Report and Written Opinion Issued in PCT Application No. PCT/US2019/037135", dated Sep. 26, 2019, 11 Pages.

"Non-Final Office Action Issued in U.S. Appl. No. 16/016,357", dated Jul. 28, 2020, 22 Pages.

"Non Final Office Action Issued in U.S. Appl. No. 16/016,357", dated Feb. 20, 2020, 16 Pages.

* cited by examiner

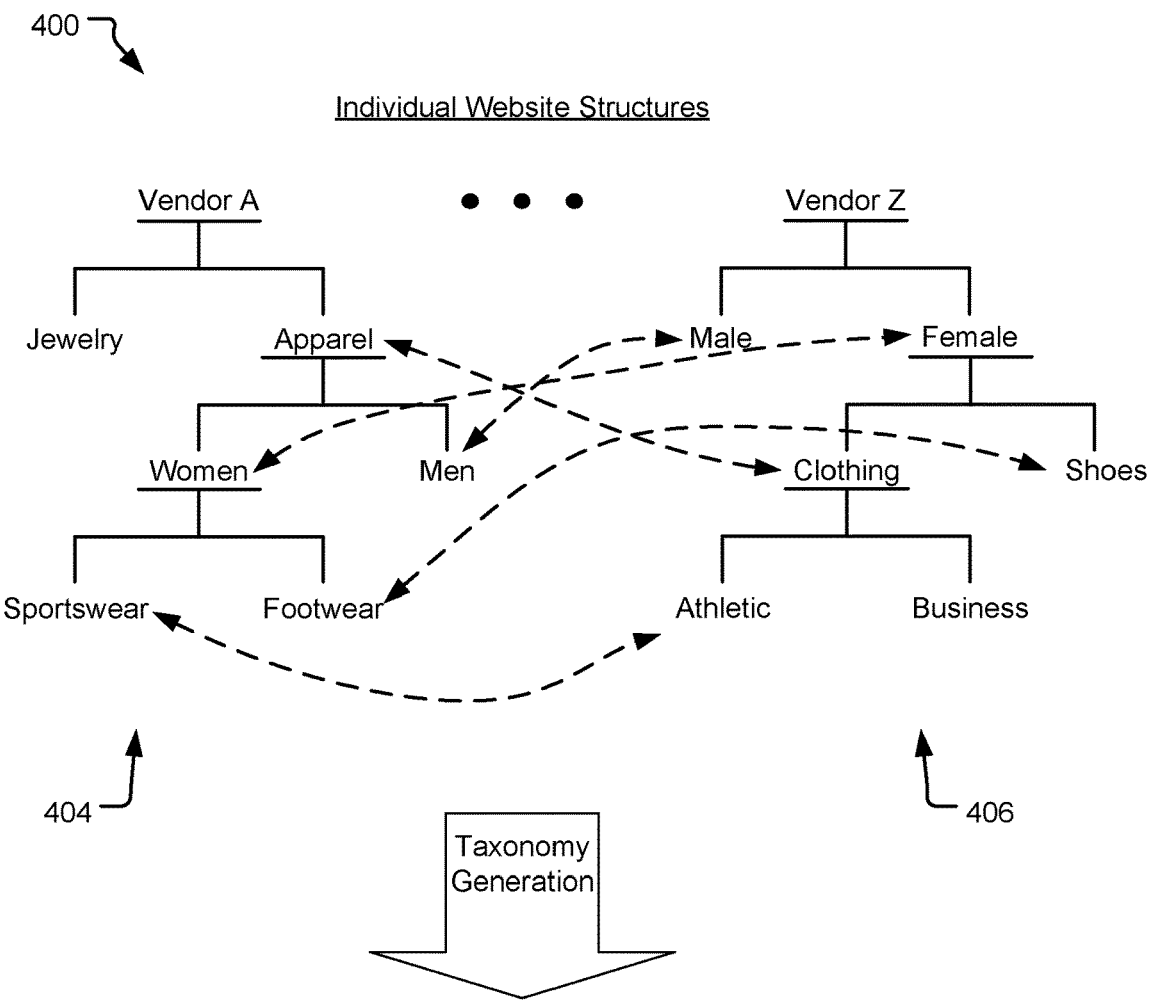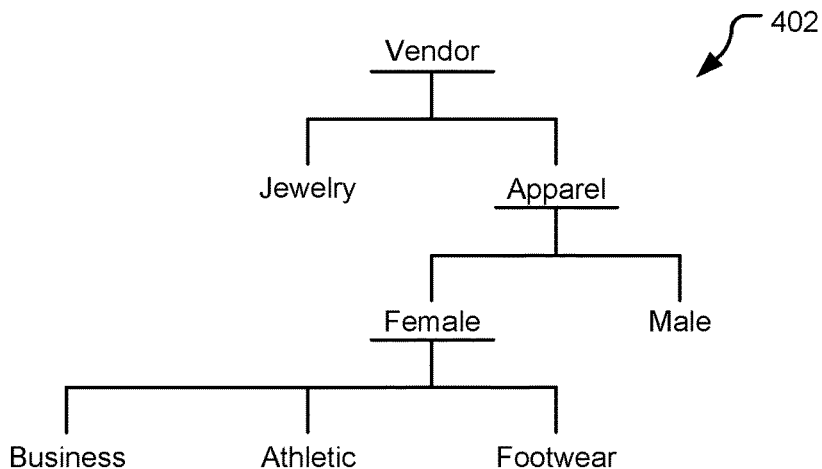
FIG. 4

TOPIC SET REFINEMENT

CROSS-REFERENCE TO RELATED APPLICATIONS

The present application is related to U.S. application Ser. No. 16/016,357, entitled "Taxonomic Tree Generation" and filed concurrently herewith, which is specifically incorporated herein by reference for all that it discloses and teaches.

BACKGROUND

Computing systems have been successfully programmed to understand the syntax of human language. Yet, to provide the computer system with an understanding and appreciation of the underlying meaning of human language is a different and more challenging objective. For example, a computer system may detect the term "Tacoma" in a data set but may be unable to discern between "Tacoma," the city in Washington, and "Tacoma," the model of pickup truck. In human-supervised techniques, human domain experts can provide the underlying meaning, but an unsupervised computing system does not have access to such human-provided meaning. As such, unsupervised computing systems tend to be less accurate in their understanding of human language than supervised computing systems, but the human supervision is expensive and less scalable than unsupervised techniques. Nevertheless, failures by a computing system to discern meanings from human language with near-human accuracy can decrease the value of data searches, web searches, product recommendations, spell checking, speech-to-text and text-to-speech conversion, verbal human-computer interaction, data classification, and other computerized services.

SUMMARY

The described technology provides for a computing system including one or more processors generates a topic set for a domain. A taxonomic evaluator is executed by the one or more processors to evaluate a set of category clusters generated from domain-specific textual data against a domain-specific taxonomic tree based on a coherency condition and to identify the category clusters that satisfy the coherency condition. The domain-specific taxonomic tree is generated from hierarchical structures of documents relating to the domain. Each identified category cluster is labeled with a label. A topic set creator is executed by the one or more processors to insert the labels of the set of identified category clusters into the topic set for the domain.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 4 illustrates example category conflation to enhance accuracy of extracting a unified taxonomic tree for a domain from hierarchical web document structures.

DETAILED DESCRIPTIONS

A computing system may determine accurate meanings of phrases (e.g., topics) for a domain (e.g., an industry, an area of research) in an automated or semi-automated fashion by constructing a taxonomic tree (a structured set of categories) into which those phrases may be accurately categorized. Domain data from which the taxonomic tree and topics are constructed may be structured in nature, such as in a hierarchical structure of web documents (e.g., "products.office.com/en-us/business/small-business-solutions"), or unstructured, such as in a set of textual terms (e.g., queries, web page titles, textual context of web pages, or text from selected search results) captured from web searches. In the described technology, both structured and unstructured domain may be used in combination to obtain and refine domain-specific topics that are accurate even for large, highly-heterogeneous documents collections, such as the World Wide Web.

By generating a unified taxonomic tree, a computing system can capture human-created labels and relationships from multiple websites or other document repositories. These human-created labels and relationships act as a substitute for human-supervision in the topic generation process, allowing a topic extracting computing system to extract topic information of a large corpus of terminology and documents and omit the human interaction. Omitting human supervision also decouples biases that can be introduced by a single human supervisor. Accordingly, in the described technology, an objective evaluation of the human-created labels and relationships found in the hierarchical structures of the document collections and the categories extracted from the query-URL click graph can generate very accurate (e.g., nearly-human-accurate or better) topics without human supervision. An accurate unified taxonomic tree is a component of such unsupervised topic extraction.

Figure 1:
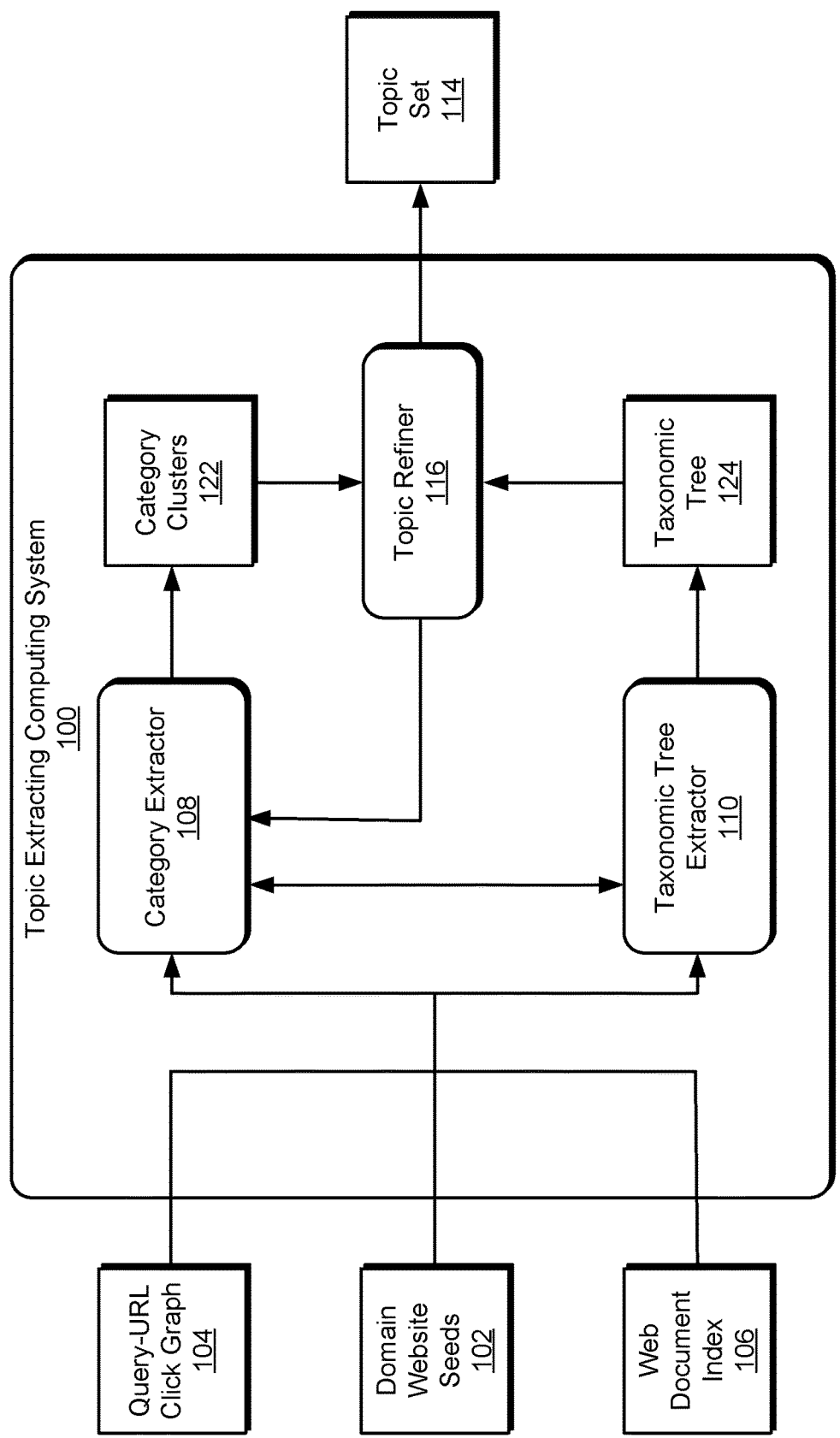
FIG. 1 illustrates an example topic extracting computing system.

FIG. 1 illustrates an example topic extracting computing system 100. An output of the topic extracting computing system 100 can include a list of domain-specific topics, generated from an extensive collection of documents in an unsupervised fashion. A domain, such as a particular industry, field of study, product market, etc., is identified for such topic extraction, and the resulting topics are generated in the context of that domain. For example, in a domain "automobile market," the term "mustang" has a different meaning than in a domain "horses." As such, identification of a domain and applying the domain's context to the topic extraction process can disambiguate the meanings of terms and provide improved results over other unsupervised approaches.

A set of domain-specific website seeds 102 are input to the topic extracting computing system 100 as one factor identifying a particular domain. For example, for the domain "automobile market," top-level domains for major automobile vendors may be provided as seeds 102. Examples include "www.ford.com," "www.chevrolet.com," and "www.audi.com" may be provided as seeds 102 for defining the scope and details of the domain. As described in more detail with regard to FIGS. 2 and 3, the seeds 102 may be used to identify additional websites in the domain through a process referred to as domain website mining. The more websites used in the topic extraction process, the larger number of potential domain-specific topics and the better the accuracy achieved in the process.

A query-URL click graph 104 is input to the topic extracting computing system 100. The query-URL click graph 104 includes a graph of nodes and edges, where an edge represents a relationship between two nodes. In the query-URL click graph 104, an edge indicates that a document (e.g., designated by a URL) was selected (e.g., "clicked") for a query during a user's web browsing activity. When a user types or otherwise invokes a query in a browsing session and then selects a search result, a query-URL association is created. By logging a large number of click events, the search engine can accumulate a large number of query-URL pairs into a query-URL click graph, where each query is adjacent to one or more URLs, and each URL is adjacent to one or more queries. The query-URL click graph, therefore, provides a description of aggregated user activity relating queries to documents (e.g., identified by URLs). In some implementations, the query-URL click graph may also include additional metadata associated with each query, such as the geographical location from which the query and/or URL click was executed, the computing device through which the query and/or URL click was executed, etc. In general, the text extracted from the query-URL click graph 104 is considered "unstructured."

A web document index 106 is also input to the topic extracting computing system 100. The web document index 106 stores the hierarchical structures of web pages on websites throughout the World Wide Web, including the web page content. Example hierarchical paths in hierarchical structures include without limitation "www.microsoft.com/en-us," "www.microsoft.com/en-us/p/surface-laptop/90fc23dv6snz?activetab=pivot%3aoverviewtab," and "https://www.microsoft.com/en-us/p/surface-book-2/8mcpzjjcc98c?activetab=pivot%3aoverviewtab." Often, the hierarchical structures and their associated tags at each hierarchical level are specified by a webmaster or developer and follow a web standard, such as schema.org. The hierarchical structures and their tags can typically be extracted through programmatic mechanisms, such as HTML parsing and pattern matching, as part of the web document index creation process. Example phrases that may be relevant within a domain of "computing devices" may include without limitation "surface-laptop" and "surface-book-2." It should be understood that other document indices may be employed, such as an index for a private document repository (e.g., a cloud-based file system, an index for an Intranet of an enterprise). In general, the text extracted from the web document index 106 is considered "structured," by virtue of the hierarchical structure that is communicated to the topic extracting computing system 100.

Based on the input from the domain website seeds 102, the query-URL click graph 104, and the web document index 106, the topic extracting computing system 100 extracts categories using a category extractor 108 for the unstructured text and a taxonomic tree extractor 110 for the structured text. The category extractor 108 works with the inputs and the taxonomic tree extractor 110 to generate category clusters 122 for the identified domain and to further refine these category clusters into a domain-specific topic set 114 via a topic refiner 116. The taxonomic tree extractor 110, in contrast, works with the inputs and the category extractor 108 to generate a taxonomic tree 124 that represents a unified hierarchical structure of categories extracted from the web document index 106 for the identified domain. More details of the category extractor 108 are provided with respect to FIG. 2, and more details of the taxonomic tree extractor 110 are provided with respect to FIG. 3.

As an example of the operation of the topic extracting computing system 100, assume a domain of "automobile industry" and that seeds 102 include "www.ford.com," "www.chevrolet.com," and "www.audi.com." In one implementation, the topic extracting computing system 100 would "mine" additional domain-specific websites based on the seeds 102 to provide a larger set of domain-specific websites for extraction. The category extractor 108 extracts, from the query-URL click graph 104 (and possibly from the web document index 106), unstructured text (e.g., lacking hierarchical structure) that is determined to be relevant to the identified domain (e.g., as articulated by the domain website seeds and other "mined" websites). The category extractor 108 collects phrases including one or more terms from this unstructured text. Phrases having similar meanings are clustered together into a single category cluster (e.g., one of the category clusters 122) so that the meaning of each category cluster is typically represented by multiple phrases. The category extractor 108 attributes a representative label to each category cluster. Each category cluster represents a "candidate" topic, subject to evaluation by the topic refiner 116.

The taxonomic tree extractor 110 extracts, from the web document index 106, hierarchical structures that are determined to be relevant to the identified domain (e.g., as articulated by the domain website seeds and other "mined" websites) and generates the taxonomic tree 124 that unifies the hierarchical structures and category labels (e.g., at each node of the tree) for the identified domain. As such, the taxonomic tree extractor 110 operates on structured data, wherein the hierarchical structures of the documents and their associated tags at each hierarchical level are specified by a webmaster or developer and provide insight to the human-attributed meanings and/or relationships among the associated tags.

The topic refiner 116 includes a taxonomic evaluator executed by one or more processors that evaluate the category clusters 122 against the taxonomic tree 124 to determine whether the generated category clusters 122 satisfy a coherency condition. For example, a cluster of ten categories that the topic refiner determined to be at the same level of hierarchy in the taxonomic tree 124 may be deemed to satisfy the coherency condition in one implementation and, therefore, be output as the domain-specific topic set 114. Alternatively, or additionally, the cluster of ten categories that the topic refiner determined to be in the same direct lineage of the taxonomic tree 124 may be deemed to satisfy the coherency condition and, therefore, be output as the domain-specific topic set 114. As such, the topic refiner 116 also includes a topic set creator executed by the one or more processors that insert the set of category clusters into the domain-specific topic set 114 for the domain. In contrast, if the cluster of ten categories are determined not to be at the same level of hierarchy or in the same direct lineage of the taxonomic tree 124, the cluster of ten categories is determined not to satisfy the coherency condition and, therefore, the topic refiner 116 signals the category extractor 108 to provide a different set of categories for evaluation. In some implementations, failure to satisfy the coherency condition may also invite some level of human intervention to select a new, refined set of category clusters 122, although the selection may be unsupervised in most implementations.

Figure 2:
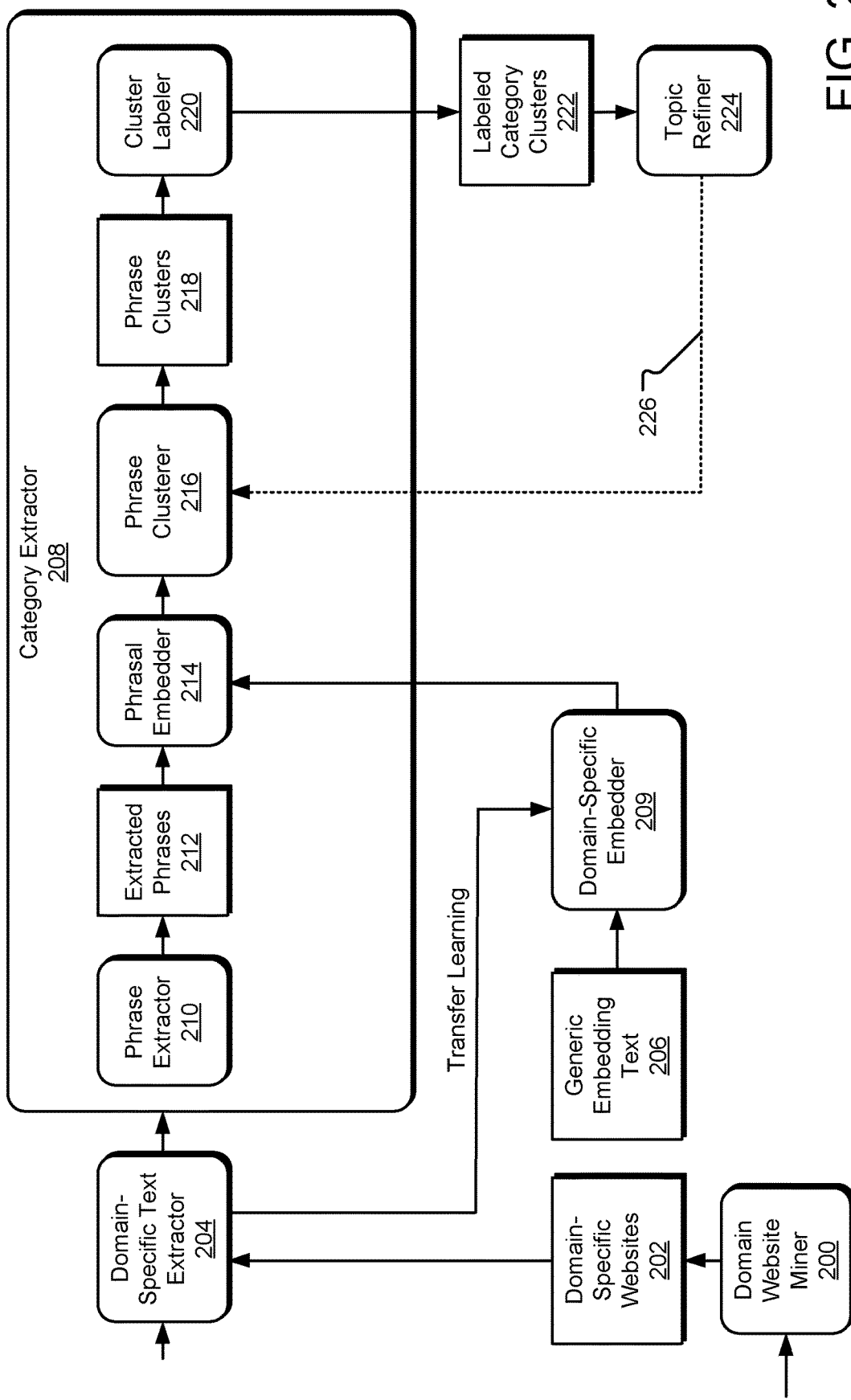
FIG. 2 illustrates an example category extractor for extracting categories for a domain from unstructured text.

FIG. 2 illustrates an example category extractor 208 for extracting categories for a domain from unstructured text. In one implementation, a domain website miner 200 of a topic extracting computing system analyzes the domain-specific website seeds, the query-URL click graph and the web document index to identify additional websites from which to extract domain-specific information. In other implementations, a large enough number of domain-specific websites is provided as seeds so that the extra step of mining unnecessary.

In one implementation, the domain website miner 200 receives the domain-specific website seeds, analyzes the hierarchical structures, content, and associated query-URL click graph data associated with those website seeds to identify other websites with a similar domain subject matter. For example, phrases from the seed websites for the domain and other candidate websites for the domain may be embedded as vectors in a multi-dimensional vector space. Those websites having phrases satisfying a domain relationship condition with the seed websites are then deemed members of the domain-specific websites 202, along with the domain-specific website seeds. One example of a domain relationship condition is a determination of whether a threshold number of phrases from another website are clustered within the same phrase cluster as those of the seed websites. Other grouping and/or similarity determination may be used to determine whether a domain relationship condition is satisfied, such as cosine similarity.

A domain-specific text extractor 204 of the topic extracting computing system also receives the hierarchical structures, content, and associated query-URL click graph data, as well as the domain-specific websites 202 to extract domain-specific text from the inputs. A similar domain relationship condition may be used to determine whether queries, search results, text, content, etc. from these inputs are part of the domain elements. Text from the domain-specific text extractor 204 is combined with generic embedding text 206 in a domain-specific embedder 209 of the topic extracting computing system, which maps the domain-specific text as vectors in a multi-dimensional vector space.

The domain-specific text is also passed into a phrase extractor 210 of the category extractor 208 of the topic extracting computing system. The phrase extractor 210 extracts phrases having one or more terms (extracted phrases 212) from the domain-specific text to provide sequential and grammatical context for phrases. Example phrases in the domain "automobile vendor" may include without limitation "Toyota Tacoma," "Tacoma Toyota," and "F-150." In each example, the terms and their placement in the phrase provide context for the meaning of the phrase that may be less evident when examining the individual terms themselves. For example, the term "Tacoma" suggests a different meaning depending on whether it precedes or succeeds the term "Toyota." In addition, the phrase "F-150" has meaning that exceeds its components "F" and "150," especially when compared to the phrase "F-250."

A phrasal embedder 214 then embeds the extracted phrases 212 as vectors in the domain-specific multi-dimensional vector space of the domain-specific embedding provided by the domain-specific embedder 209. The domain-specific embedding provides additional context for the extracted phrases 212. For example, the term "Tacoma" in the domain "automobile vendor" is more likely to have a meaning as a truck model than as a city in Washington. Domain-specific embedding, therefore, maps the extracted phrases into the domain-specific multi-dimensional vector space so as to preserve this domain-specific meaning.

A phrase clusterer 216 allocates the query vectors into groups ("clusters") of relative similarity to yield phrase clusters 218 as groups of similar vectors in the domain-specific multi-dimensional vector space. Clusters include vectors that satisfy a similarity condition with respect to each other (e.g., within a predetermined distance from each other in the multidimensional vector space). The phrase clusterer 216 can be operated to generate a predetermined number ("K") of clusters. K is a clustering parameter that can be adjusted to generate a larger number or smaller number of clusters (where K is the number of clusters generated), depending on the accuracy of the category extraction, as will be discussed below.

A cluster labeler 220 selects a representative label from the set of phrase clusters 218 in each category clusters. For example, in a category cluster that includes the phrases "apparel," "suits," "male," and "female," a label of "apparel" may be selected. In one implementation, a topic refiner 224 evaluates the labeled category clusters 222 against a coherency condition, which evaluates the category clusters 222 with a taxonomic tree for the relevant domain. If a labeled category cluster satisfies the coherency condition, the category cluster is deemed a satisfactory topic for output by the topic extracting computing system. If the category cluster does not satisfy the coherency condition, the category cluster is deemed unsatisfactory for output as a topic of the topic extracting computing system. The topic refiner 224 evaluates each labeled category cluster against the coherency condition and outputs the label of any category clusters that satisfies the coherency condition. Such evaluation may continue until the desired number of domain-specific topics have been generated.

In one implementation, the topic refiner 224 iterates through different sets of labeled category clusters 222. For example, if the topic refiner 224 processes all of the labeled category clusters 222 and has not generated enough domain-specific topics (e.g., based on a predetermined number of desired topics), the topic refiner 224 can request the phrase cluster 216 for a new set of phrase clusters 218, which are labeled to yield a new (different) set of labeled category clusters 222. In one implementation, the phrase clusterer 216 can generate a new set of phrase clusters 218 using a different clustering parameter (e.g., K) or clustering technique (as indicated by dashed arrow 226). In other implementation, a new (different) set of labeled category clusters 222 may be generated, at least in part, by incorporating human-supervised input, adjusting the domain-specific embedding or the set of domain-specific websites 202, or by some other technique.

The new set of labeled category clusters 222 is then evaluated against the coherency condition. The topic refining process may iterate until an acceptable number of refined topics are obtained.

Figure 3:
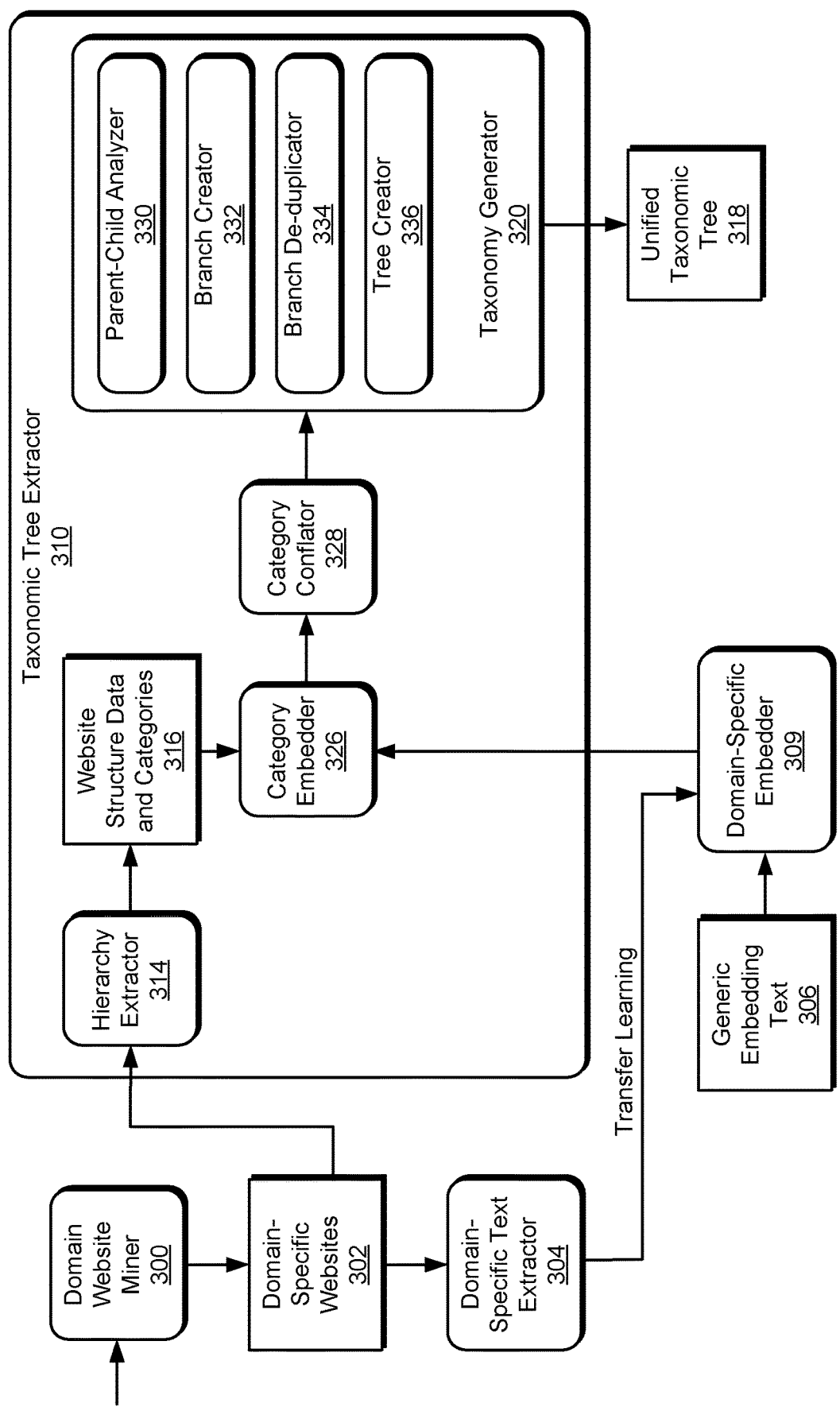
FIG. 3 illustrates an example taxonomic tree extractor for extracting a taxonomic tree for a domain from structured web documents.

FIG. 3 illustrates an example taxonomic tree extractor 310 for extracting a taxonomic tree for a domain from structured documents. In one implementation, a domain website miner 300 of a topic extracting computing system analyzes the domain-specific website seeds, the query-URL click graph and the web document index to identify additional websites from which to extract domain-specific information. In other implementations, a large enough number of domain-specific websites is provided as seeds so that the extra step of mining is unnecessary. In various implementations, the domain website miner 300 may be the same domain website miner 200 from FIG. 2 or a separate and distinct domain website miner. Likewise, the domain-specific websites 302 may be the same domain-specific websites 202 from FIG. 2 or separate and distinct set of domain-specific websites.

A domain-specific text extractor 304 of the topic extracting computing system also receives the hierarchical structures, content, and associated query-URL click graph data, as well as the domain-specific websites 302 to extract domain-specific text from the inputs. A similar domain relationship condition may be used to determine whether queries, search results, text, content, etc. from these inputs are part of the domain elements. The domain-specific text extractor 304 may be the same domain-specific text extractor 204 from FIG. 2 or a separate and distinct domain-specific text extractor. Text from the domain-specific text extractor 304 is combined via transfer learning with generic embedding text 306 in a domain-specific embedder 309 of the topic extracting computing system, which maps the domain-specific text as vectors in a multi-dimensional vector space. In various implementations, the generic embedding text 306 and the domain-specific embedder 309 may be the same the generic embedding text 206 and the domain-specific embedder 209 from FIG. 2 or a separate and distinct generic embedding text and a separate and distinct domain-specific embedder.

A hierarchy extractor 314 of the taxonomic tree extractor 310 analyzes the hierarchies and semantic data of the domain-specific websites 302 and extracts tags (e.g., labels or categories) of each node and the associated ancestor-descendant relationships for the nodes in the hierarchies. The resulting website structure data and categories 316 for each are input to a category embedder 326, which maps the domain-specific text as multidimensional category vectors in a domain-specific multi-dimensional vector space based on the embedding provided by the domain-specific embedder 309. For example, among the factors in one implementation of catalog embedding are the categories for each node and the ancestor-descendant relationship for each node. A variety of other category and semantic information combinations may be included in the catalog embedding in various implementations.

Given the presumably intelligent manner in which a human would structure the hierarchy of a website, the hierarchical structure of each website communicates some level of human understanding of meaning embodied in each web page. As such, a first website about retail apparel may group men's clothing and women's as sibling nodes of the website hierarchy under a "clothing" node, while another may divide men's and women's clothing along different branches of the website hierarchy where "men" and "women" are sibling nodes and "clothing," "footwear," and "accessories" are gender-specific sibling under each gender node. By analyzing a large number of website hierarchies, the taxonomic tree extractor 310 can conflate the nodes having similar meanings and then create a new, unified taxonomic tree with coherent tree lineage representing an inherited relationship of meaning and sibling groups that share similarity of meaning.

Accordingly, a category conflator 328 receives the embedded categories for each hierarchical structure and clusters the category vectors from different levels of different hierarchical structures. Clusters include vectors that satisfy a similarity condition with respect to each other (e.g., within a predetermined distance from each other in the multidimensional vector space). In this manner, the category conflator 328 generates clusters of category vectors sharing common meaning, independent of their hierarchical relationship with other nodes in their hierarchical structures.

A taxonomy generator 320 receives the conflated category vectors and the hierarchical structure data from the category conflator 328. An ancestor-descendant analyzer 330 analyzes the hierarchical structures associated with each node to determine an ancestor-descendant relationship for each node (e.g., to/from the node's parent, child or children, grandparent, grandchild or grandchildren). An example analysis may provide branch statistics relating to the ancestor-descendant relationships existing in the hierarchical structures of the websites. For example, using branch statistics taken from the hierarchical structures of the domain-specific websites 302, the ancestor-descendant analyzer 330 can determine the most frequently-applied ancestor-descendant relationships for a given conflated category cluster in the website hierarchies. Each conflated category cluster constitutes a new "candidate" node for the new taxonomic tree 318. Other considerations (i.e., other than "most frequently-applied") may also be employed when evaluating the ancestor-descendant relationships including without limitation factors resulting in a deeper or shallower tree, a tree having the most or fewest nodes, or a tree having the more or fewest branches. Based on the determinations of the ancestor-descendant analyzer 330, a branch creator 332 creates branches for each new candidate node.

A branch de-duplicator 334 analyzes each branch to identify duplicate branches from the same node at each hierarchal level. Duplicate branches from the same node can arise during taxonomic tree generation when a child node of that node is deleted. For example, if a hierarchical structure includes a "women→accessories→jewelry" path and a "women→jewelry" path from a node labeled "women," the statistics on the hierarchical structures may show that the "women→accessories→jewelry" path is less common than the "women→jewelry" path. Accordingly, the branch creator 332 may connect all of the branches from the "accessories" node to the "women" node and then delete the "accessories" node. This optimization results in there being two "women→jewelry" branches from the "women" node. The branch de-duplicator 334 detects these duplicate branches and merges the duplicate branches into a single "women→jewelry" branch.

The ancestor-descendant analyzer 330, the branch creator 332, and the branch de-duplicator 334 yield a new set of nodes and branches, with the associated category for each branch. A tree creator 336 combines the resulting nodes and branches into the new unified taxonomic tree 318.

FIG. 4 illustrates example category conflation 400 to enhance accuracy of extracting a unified taxonomic tree 402 for a domain from hierarchical web document structures 404 through 406. The hierarchical web document structure 404 (Vendor A) and the hierarchical web document structure 406 (Vendor Z) are just two of many individual website structures included in this example. The hierarchical web document structure 404 includes nodes labeled with the node categories "apparel," "women," "men,", "footwear," and "sportswear," all of which have similar meanings to node categories in the hierarchical web document structure 406, "clothing," "female," "male,", "shoes," and "athletic," respectively. These similarities in meaning are identified by clustering the category vectors, as described previously.

Clustering is applied to category vectors for nodes at different levels of each hierarchical structure. For example, the node labeled "men" in the hierarchical web document structure 404 is at the same hierarchical level as the node labeled "shoes" in the hierarchical web document structure 406. In contrast, the category vector for the node labeled "men" of the hierarchical web document structure 404 is in a different level as compared to the category vector for the node labeled "male" of the hierarchical web document structure 406, and yet the category conflator clusters these nodes together into the same category node for the unified taxonomic tree 402. Such conflation is performed on multiple category nodes for multiple hierarchical web document structures, wherein some category nodes are conflated, and other category nodes are deleted or ignored for lack of sufficient similarity (e.g., "jewelry" in the hierarchical web document structure 404 and "business" in the hierarchical web document structure 406). A taxonomy generation operation then creates the unified hierarchical structure into which the conflated category nodes are installed to fill out the unified taxonomic tree 402.

The taxonomy generation operation also selects a category to be a label for each node of the unified taxonomic tree 402. In one implementation, the category labels are selected from the most frequently applied category labels for the corresponding nodes in the set of hierarchical structures of the domain-specific websites. For example, in a first cluster of category vectors corresponding to "apparel" in the hierarchical web document structure 404 and "clothing" in the hierarchical web document structure 406 (as well as all other hierarchical web document structures between 404 and 406), the most commonly used label in that cluster from all of the hierarchical web document structures is selected as the corresponding category label for that node in the unified taxonomic tree 402 ("apparel" in this example). In other implementations, other statistical and non-statistical considerations may be applied, including without limitation the frequency of use of certain applicable terms in the query-URL click graph and Term Frequency-Inverted Document Frequency (TF-IDF).

Figure 5:
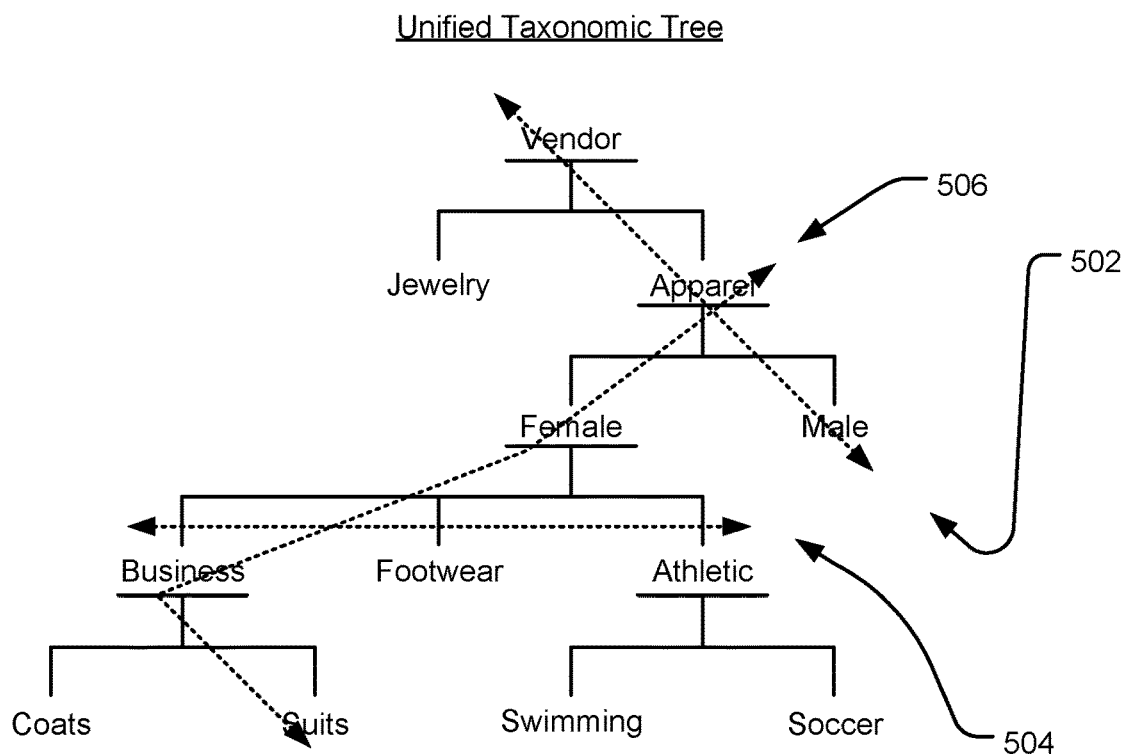
FIG. 5 illustrates example topic refinement to enhance accuracy of topics related to a domain.

FIG. 5 illustrates node relationships in a taxonomic tree 500 as applied in an example coherency condition. In the illustrated implementation, three example components of the example coherency condition are shown by the dashed arrows: an example sibling relationship 504, an example ancestor-descendant relationship 502, and another example ancestor-descendant relationship 506. It should be understood, however, that additional sibling and ancestor-descendant relationships are illustrated in the taxonomic tree 500.

A topic refiner evaluates each labeled catalog cluster against a coherency condition. If the labeled category cluster satisfies the coherency condition, then the label is output as a refined topic into a refined topic set. The example coherency condition described with reference to FIG. 5 is satisfied by identifying semantic matches of the members of a labeled category cluster and node categories of the taxonomic tree 500. Semantic matches include textual matches of individual phrases and similarity matches of individual phrase vectors using a similarity evaluation, such as cosine similarity. Four examples evaluations are shown below the taxonomic tree 500 in a table 508 of FIG. 5.

In the example evaluations shown in FIG. 5, the coherency condition is satisfied when all of the category cluster members are found to have semantic matches with labeled nodes in a coherency set including nodes having a sibling relationship and nodes having an ancestor-descendant relationship. When identifying semantic matches between the labeled catalog cluster members and the taxonomic tree 500, the topic refiner may find that some of the members do not semantically match any node category or node label of the taxonomic tree 500, in which the coherency condition is not satisfied.

The first example shows a labeled catalog cluster having the members "apparel," "suits," "male," and "female" and the label "apparel," which is selected from the members or generated via other mechanisms. When compared to the taxonomic tree 500, the semantically matched nodes of the labeled catalog cluster members "apparel," "suits," and "female" are in the same ancestor-descendant linear relationship and the labeled catalog cluster members "female" and "male" are in the same sibling relationship (under the node category "apparel"). Accordingly, the labeled catalog cluster of the first example is deemed "coherent" (its members are in the same coherency set and therefore satisfy the coherency condition). Thus, the label "apparel" of the catalog cluster is inserted as a refined topic to the refined topic set by virtue of this labeled catalog cluster.

The second example shows a labeled catalog cluster having the members "jewelry," "footwear," "menswear," and "female" and the label "jewelry," which is selected from the members or generated via other mechanisms. When compared to the taxonomic tree 500, the labeled catalog cluster member "menswear" is identified as having a semantic match with the node category "male" in the taxonomic tree 500. However, the semantically matched nodes of the members do not form a coherency set—while "male" and "female" are in a sibling relationship, "jewelry" and "footwear" are not in an ancestor-descendant relationship, so the labeled catalog cluster of the second example is deemed "non-coherent" (its members are not in the same coherency set and therefore do not satisfy the coherency condition). Thus, the label "jewelry" of the catalog cluster is not inserted as a refined topic to the refined topic set by virtue of this labeled catalog cluster.

The third example shows a labeled catalog cluster having the members "apparel," "footwear," and "womenswear" and the label "apparel," which is selected from the members or generated via other mechanisms. When compared to the taxonomic tree 500, the labeled catalog cluster member "womenswear" is identified as having a semantic match with the node category "female" in the taxonomic tree 500. Further, the semantically matched nodes of the labeled catalog cluster members "apparel," "footwear," and "female" are in the same ancestor-descendant linear relationship. Accordingly, the labeled catalog cluster of the third example is deemed "coherent" (its members are in the same coherency set and therefore satisfy the coherency condition). Thus, the label "apparel" of the catalog cluster is inserted as a refined topic to the refined topic set. As this label has already been inserted into the refined topic set in the first example, it need not be re-inserted, or refined topics may be de-duplicated at completion.

The fourth example shows a labeled catalog cluster having the members "suits," "male," and "menswear" and the label "male," which is selected from the members or generated via other mechanisms. When compared to the taxonomic tree 500, the labeled catalog cluster member "menswear" is identified as having a semantic match with the node category "male" in the taxonomic tree 500. However, the semantically matched nodes of the members do not form a coherency set—while "male" and "menswear" are matched to the same node and therefore deemed to be in a sibling relationship under the node category "apparel," "suits" is not in an ancestor-descendant relationship with either "male" or "menswear," so the labeled catalog cluster of the fourth example is deemed "non-coherent" (its members are not in the same coherency set and therefore do not satisfy the coherency condition). Thus, the label "male" of the catalog cluster is not inserted as a refined topic to the refined topic set by virtue of this labeled catalog cluster.

Figure 6:
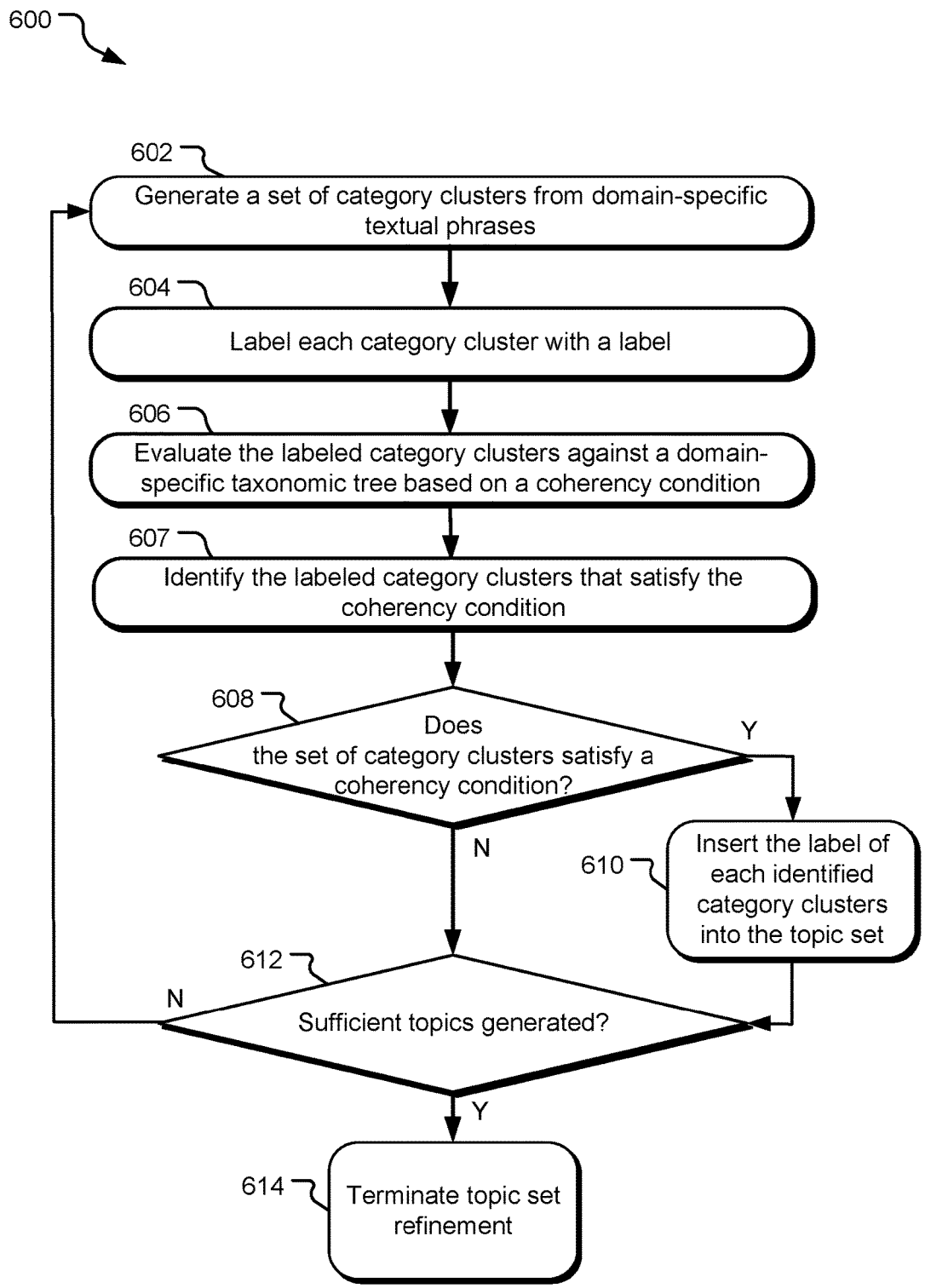
FIG. 6 illustrates example operations for generating a taxonomic tree for a domain.

FIG. 6 illustrates example operations 600 for generating a taxonomic tree for a domain. A generation operation 602 generates a set of category clusters from domain-specific textual phrases (e.g., textual data). A labeling operation 604 labels each category cluster with a label. An evaluation operation 606 evaluates each labeled category cluster against a domain-specific taxonomic tree based on a coherency condition. In one implementation, the set of category clusters is generated by embedding the domain-specific textual phrases as phrase vectors in a multidimensional vector space clustering the phrase vectors into phrase clusters based on a similarity condition. Other category cluster generation techniques may be employed.

In one implementation, the domain-specific taxonomic tree includes multiple unique coherent sets. Each unique coherent set of the domain-specific taxonomic tree includes node categories that are siblings in the domain-specific taxonomic tree and node categories sharing an ancestor-descendant relationship of the domain-specific taxonomic tree. In one implementation, the evaluation includes identifying semantic matches between members of each labeled category cluster and node categories of the taxonomic tree. Semantic matches include textual matches of individual phrases and similarity matches of individual phrase vectors using a similarity evaluation, such as cosine similarity. The identifying operation 607 identifies the labeled category clusters that satisfy the coherency condition.

If a labeled category cluster is identified as satisfying a coherency condition, then a decision operation 608 routes processing to an insertion operation 610, which inserts the label of the identified category cluster into the topic set and routes processing to a decision operation 612. If not, the decision operation 608 routes processing to the decision operation 612, which determines whether sufficient topics have been generated. If so, the decision operation 612 routes process to a termination operation 614, which terminates the topic set refinement process. Otherwise, processing loops back to the generation operation 602, which generates a new (different) set of category clusters.

Figure 7:
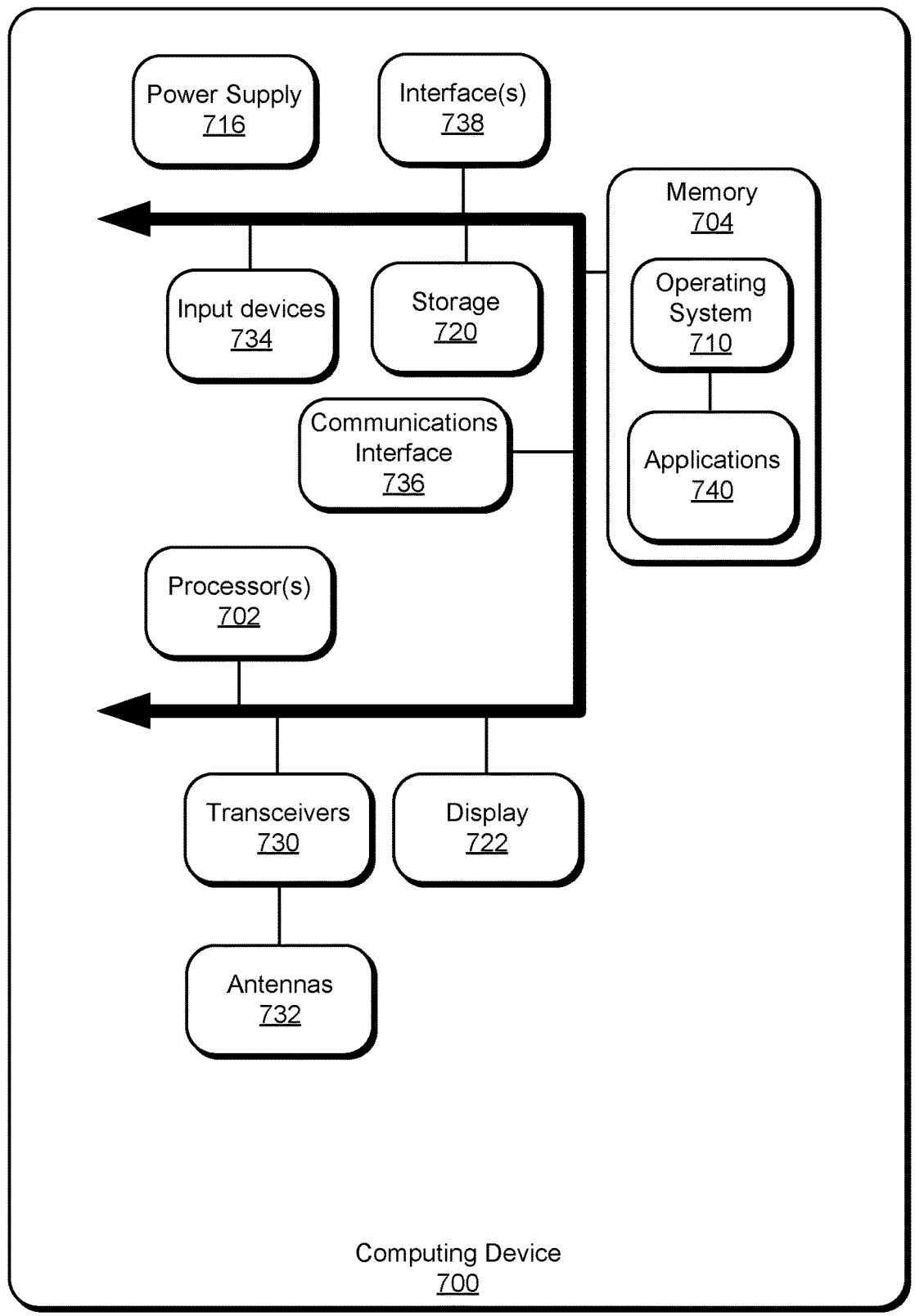
FIG. 7 illustrates an example computing device that may be useful in implementing the described technology to generate a taxonomic tree for a domain.

FIG. 7 illustrates an example computing device 700 that may be useful in implementing the described technology to generate a taxonomic tree for a domain. The computing device 700 may be a personal or enterprise computing device, such as a laptop, mobile device, desktop, tablet, or a server/cloud computing device. The computing device 700 includes one or more processor(s) 702, and a memory 704. The memory 704 generally includes both volatile memory (e.g., RAM) and non-volatile memory (e.g., flash memory). An operating system 710 and one or more applications 740 may reside in the memory 704 and be executed by the processor(s) 702.

One or more modules or segments, such as a domain-specific text extractor, a phrase extractor, a phrasal embedder, a phrase clusterer, a cluster labeler, a domain website miner, a domain-specific embedder, a hierarchy extractor, a category embedder, a category conflator, a taxonomy generator, an ancestor-descendant analyzer, a branch creator, a branch de-duplicator, a tree creator, and other components are loaded into the operating system 710 on the memory 704 and/or storage 720 and executed by the processor(s) 702. Data, such as domain-specific websites, extracted phrases, phrase clusters, category clusters, website structure data and categories, a unified taxonomic tree, and other data and objects, may be stored in the memory 704 or storage 720 and may be retrievable by the processor(s) 702. The storage 720 may be local to the computing device 700 or may be remote and communicatively connected to the computing device 700.

The computing device 700 includes a power supply 716, which is powered by one or more batteries or other power sources and which provides power to other components of the computing device 700. The power supply 716 may also be connected to an external power source that overrides or recharges the built-in batteries or other power sources.

The computing device 700 may include one or more communication transceivers 730 which may be connected to one or more antenna(s) 732 to provide network connectivity (e.g., mobile phone network, Wi-Fi®, Bluetooth®) to one or more other servers and/or client devices (e.g., mobile devices, desktop computers, or laptop computers). The computing device 700 may further include a communications interface 736, which is a type of communication device. The computing device 700 may use the adapter and any other types of communication devices for establishing connections over a wide-area network (WAN) or local-area network (LAN). It should be appreciated that the network connections shown are exemplary and that other communications devices and means for establishing a communications link between the computing device 700 and other devices may be used.

The computing device 700 may include one or more input devices 734 such that a user may enter commands and information (e.g., a keyboard or mouse). These and other input devices may be coupled to the server by one or more interfaces 738 such as a serial port interface, parallel port, or universal serial bus (USB). The computing device 700 may further include a display 722 such as a touchscreen display.

The computing device 700 may include a variety of tangible processor-readable storage media and intangible processor-readable communication signals. Tangible processor-readable storage can be embodied by any available media that can be accessed by the computing device 700 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 700. In contrast to tangible processor-readable storage media, intangible processor-readable communication signals may embody processor-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Some implementations may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

An example method of generating a topic set for a domain includes generating a set of category clusters from domain-specific textual data, labeling each category cluster with a label, evaluating the labeled category clusters against a domain-specific taxonomic tree based on a coherency condition, identifying the labeled category clusters that satisfy the coherency condition, and inserting the label of each of the identified category clusters into the topic set for the domain, responsive to identifying the labeled category clusters that satisfy the coherency condition. The domain-specific taxonomic tree is generated from hierarchical structures of documents relating to the domain.

Another example method of any preceding method is provided wherein the evaluating operation includes identifying semantic matches between each cluster member of each labeled category cluster of the set and node categories of the domain-specific taxonomic tree.

Another example method of any preceding method is provided wherein the domain-specific taxonomic tree includes multiple unique coherent sets. Each unique coherent set of the domain-specific taxonomic tree includes node categories that are siblings in the domain-specific taxonomic tree and node categories sharing an ancestor-descendant relationship of the domain-specific taxonomic tree.

Another example method of any preceding method is provided wherein the coherency condition is satisfied by a category cluster having all cluster members semantically matched to node categories in the same unique coherent set of the domain-specific taxonomic tree.

Another example method of any preceding method is provided wherein the evaluating operation further includes embedding the domain-specific textual data as phrase vectors in a multidimensional vector space and generating the set of category clusters from domain-specific textual data by clustering the phrase vectors into phrase clusters based on a similarity condition, the set of category clusters being selected from the phrase clusters.

Another example method of any preceding method further includes generating a different set of category clusters from the domain-specific textual data, labeling each category cluster of the different set with a label, evaluating the labeled category clusters of the different set against the domain-specific taxonomic tree based on the coherency condition, identifying the labeled category clusters of the different set that satisfy the coherency condition, and inserting the label of each of the identified category clusters of the different set into the topic set for the domain, responsive to identifying the labeled category clusters that satisfy the coherency condition.

Another example method of any preceding method is provided wherein the set of category clusters and the different set of category clusters are generated using a different clustering parameter value.

Another example method of any preceding method is provided wherein at least some of the domain-specific textual data are extracted from a set of domain-specific websites.

Another example method of any preceding method is provided wherein at least some of the domain-specific textual data are extracted from a query-URL click graph.

An example computing system for generating a topic set for a domain includes one or more processors, a taxonomic evaluator executed by the one or more processors and configured to evaluate a set of category clusters generated from domain-specific textual data against a domain-specific taxonomic tree based on a coherency condition and to identify the category clusters that satisfy the coherency condition, and a topic set creator executed by the one or more processors and configured to insert of each of the identified category clusters into the topic set for the domain. The domain-specific taxonomic tree is generated from hierarchical structures of documents relating to the domain. Each identified category cluster is labeled with a label.

Another example computing system of any preceding computing system is provided wherein the domain-specific taxonomic tree includes multiple unique coherent sets. Each unique coherent set of the domain-specific taxonomic tree includes node categories that are siblings in the domain-specific taxonomic tree and node categories sharing an ancestor-descendant relationship of the domain-specific taxonomic tree. The taxonomic evaluator is further configured to identify semantic matches between each cluster member of each labeled category cluster of the set and node categories of the domain-specific taxonomic tree.

Another example computing system of any preceding computing system is provided wherein the coherency condition is satisfied by a category cluster having all cluster members semantically matched to node categories in the same unique coherent set of the domain-specific taxonomic tree.

Another example computing system of any preceding computing system is provided wherein the taxonomic evaluator is further configured to generate a different set of category clusters from the domain-specific textual data, evaluate the labeled category clusters of the different set against the domain-specific taxonomic tree based on the coherency condition, and identify the labeled category clusters of the different set that satisfy the coherency condition. Each identified category cluster of the different set is labeled with a label. The topic set creator is further configured to insert the label of each of the identified category clusters of the different set into the topic set for the domain, responsive to identification of the labeled category clusters that satisfy the coherency condition.

Another example computing system of any preceding computing system is provided wherein the set of category clusters and the different set of category clusters are generated using a different clustering parameter value.

One or more example tangible processor-readable storage media of a tangible article of manufacture encode processor-executable instructions for executing on an electronic computing system a process of generating a topic set for a domain, the process including generating a set of category clusters from domain-specific textual data, labeling each category cluster with a label, evaluating the labeled category clusters against a domain-specific taxonomic tree based on a coherency condition, the domain-specific taxonomic tree being generated from hierarchical structures of documents relating to the domain, identifying the labeled category clusters that satisfy the coherency condition, and inserting the label of each of the identified category clusters into the topic set for the domain, responsive to identifying the labeled category clusters that satisfy the coherency condition.

One or more other example tangible processor-readable storage media of any preceding media provide a process wherein the domain-specific taxonomic tree includes multiple unique coherent sets. Each unique coherent set of the domain-specific taxonomic tree includes node categories that are siblings in the domain-specific taxonomic tree and node categories sharing an ancestor-descendant relationship of the domain-specific taxonomic tree. The evaluating operation includes identifying semantic matches between each cluster member of each labeled category cluster of the set and node categories of the domain-specific taxonomic tree.

One or more other example tangible processor-readable storage media of any preceding media provide a process wherein the coherency condition is satisfied by a category cluster having all cluster members semantically matched to node categories in the same unique coherent set of the domain-specific taxonomic tree.

One or more other example tangible processor-readable storage media of any preceding media provide a process wherein the evaluating operation further includes embedding the domain-specific textual data as phrase vectors in a multidimensional vector space and generating the set of category clusters from domain-specific textual data by clustering the phrase vectors into phrase clusters based on a similarity condition, the set of category clusters being selected from the phrase clusters.

One or more other example tangible processor-readable storage media of any preceding media provide a process wherein the process further includes generating a different set of category clusters from the domain-specific textual data, labeling each category cluster of the different set with a label, evaluating the labeled category clusters of the different set against the domain-specific taxonomic tree based on the coherency condition, identifying the labeled category clusters of the different set that satisfy the coherency condition, and inserting the label of each of the identified category clusters of the different set into the topic set for the domain, responsive to identifying the labeled category clusters that satisfy the coherency condition.

One or more other example tangible processor-readable storage media of any preceding media provide a process wherein the set of category clusters and the different set of category clusters are generated using a different clustering parameter value.

An example system of generating a topic set for a domain includes means for generating a set of category clusters from domain-specific textual data, means for labeling each category cluster with a label, means for evaluating the labeled category clusters against a domain-specific taxonomic tree based on a coherency condition, means for identifying the labeled category clusters that satisfy the coherency condition, and means for inserting the label of each of the identified category clusters into the topic set for the domain, responsive to identifying the labeled category clusters that satisfy the coherency condition. The domain-specific taxonomic tree is generated from hierarchical structures of documents relating to the domain.

Another example system of any preceding system is provided wherein the means for evaluating includes means for identifying semantic matches between each cluster member of each labeled category cluster of the set and node categories of the domain-specific taxonomic tree.

Another example system of any preceding system is provided wherein the domain-specific taxonomic tree includes multiple unique coherent sets. Each unique coherent set of the domain-specific taxonomic tree includes node categories that are siblings in the domain-specific taxonomic tree and node categories sharing an ancestor-descendant relationship of the domain-specific taxonomic tree.

Another example system of any preceding system is provided wherein the coherency condition is satisfied by a category cluster having all cluster members semantically matched to node categories in the same unique coherent set of the domain-specific taxonomic tree.

Another example system of any preceding system is provided wherein the means for evaluating further includes means for embedding the domain-specific textual data as phrase vectors in a multidimensional vector space and means for generating the set of category clusters from domain-specific textual data by clustering the phrase vectors into phrase clusters based on a similarity condition, the set of category clusters being selected from the phrase clusters.

Another example system of any preceding system further includes means for generating a different set of category clusters from the domain-specific textual data, means for labeling each category cluster of the different set with a label, means for evaluating the labeled category clusters of the different set against the domain-specific taxonomic tree based on the coherency condition, means for identifying the labeled category clusters of the different set that satisfy the coherency condition, and means for inserting the label of each of the identified category clusters of the different set into the topic set for the domain, responsive to identifying the labeled category clusters that satisfy the coherency condition.

Another example system of any preceding system is provided wherein the set of category clusters and the different set of category clusters are generated using a different clustering parameter value.

Another example system of any preceding system is provided wherein at least some of the domain-specific textual data are extracted from a set of domain-specific websites.

Another example system of any preceding system is provided wherein at least some of the domain-specific textual data are extracted from a query-URL click graph.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A method of generating a topic set for a domain, the method comprising:
    generating a set of category clusters from domain-specific textual data; labeling each category cluster with a label;
    evaluating the labeled category clusters against a domain-specific taxonomic tree based on a coherency condition, the domain-specific taxonomic tree being generated from hierarchical structures of documents relating to the domain, the coherency condition being satisfied based on relative positions of the labeled category clusters within the domain-specific taxonomic tree, wherein the domain-specific taxonomic tree includes multiple unique coherent sets, each unique coherent set of the domain-specific taxonomic tree including node categories that are siblings in the domain-specific taxonomic tree and node categories sharing an ancestor-descendant relationship of the domain-specific taxonomic tree;
    identifying the labeled category clusters that satisfy the coherency condition, wherein the coherency condition is satisfied by a category cluster having all cluster members semantically matched to node categories in the same unique coherent set of the domain-specific taxonomic tree; and
    inserting the label of each of the identified category clusters into the topic set for the domain, responsive to identifying the labeled category clusters that satisfy the coherency condition.

2. The method of claim 1 wherein the evaluating operation comprises:
    identifying semantic matches between each cluster member of each labeled category cluster of the set and node categories of the domain-specific taxonomic tree.

3. The method of claim 1 wherein the evaluating operation further comprises:
    embedding the domain-specific textual data as phrase vectors in a multidimensional vector space; and
    generating the set of category clusters from the domain-specific textual data by clustering the phrase vectors into phrase clusters based on a similarity condition, the set of category clusters being selected from the phrase clusters.

4. The method of claim 1 further comprising:
    generating a different set of category clusters from the domain-specific textual data;
    labeling each category cluster of the different set with a label;
    evaluating the labeled category clusters of the different set against the domain-specific taxonomic tree based on the coherency condition;
    identifying the labeled category clusters of the different set that satisfy the coherency condition; and
    inserting the label of each of the identified category clusters of the different set into the topic set for the domain, responsive to identifying the labeled category clusters that satisfy the coherency condition.

5. The method of claim 4 wherein the set of category clusters and the different set of category clusters are generated using a different clustering parameter value.

6. The method of claim 1 wherein at least some of the domain-specific textual data is extracted from a set of domain-specific websites.

7. The method of claim 1 wherein at least some of the domain-specific textual data is extracted from a query-URL click graph.

8. A computing system for generating a topic set for a domain, the computing system comprising:
    one or more processors;
    a taxonomic evaluator executed by the one or more processors and configured to evaluate a set of category clusters generated from domain-specific textual data against a domain-specific taxonomic tree based on a coherency condition, wherein the domain-specific taxonomic tree includes multiple unique coherent sets, each unique coherent set of the domain-specific taxonomic tree including node categories that are siblings in the domain-specific taxonomic tree and node categories sharing an ancestor-descendant relationship of the domain-specific taxonomic tree, and to identify the category clusters that satisfy the coherency condition, wherein the coherency condition is satisfied by a category cluster having all cluster members semantically matched to node categories in the same unique coherent set of the domain-specific taxonomic tree, the domain-specific taxonomic tree being generated from hierarchical structures of documents relating to the domain, each identified category cluster being labeled with a label, the coherency condition being satisfied based on relative positions of the category clusters within the domain-specific taxonomic tree; and
    a topic set creator executed by the one or more processors and configured to insert each of the identified category clusters into the topic set for the domain.

9. The computing system of claim 8 wherein the taxonomic evaluator is further configured to identify semantic matches between each cluster member of each labeled category cluster of the set and node categories of the domain-specific taxonomic tree.

10. The computing system of claim 8 wherein the taxonomic evaluator is further configured to generate a different set of category clusters from the domain-specific textual data, evaluate the labeled category clusters of the different set against the domain-specific taxonomic tree based on the coherency condition, and identify the labeled category clusters of the different set that satisfy the coherency condition, each identified category cluster of the different set being labeled with a label, and the topic set creator is further configured to insert the label of each of the identified category clusters of the different set into the topic set for the domain, responsive to identification of the labeled category clusters that satisfy the coherency condition.

11. The computing system of claim 10 wherein the set of category clusters and the different set of category clusters are generated using a different clustering parameter value.

12. One or more tangible processor-readable storage media devices of a tangible article of manufacture encoding processor-executable instructions for executing on an electronic computing system a process of generating a topic set for a domain, the process comprising:

generating a set of category clusters from domain-specific textual data;
labeling each category cluster with a label;
evaluating the labeled category clusters against a domain-specific taxonomic tree based on a coherency condition, the domain-specific taxonomic tree being generated from hierarchical structures of documents relating to the domain, the coherency condition being satisfied based on relative positions of the labeled category clusters within the domain-specific taxonomic tree, wherein the domain-specific taxonomic tree includes multiple unique coherent sets, each unique coherent set of the domain-specific taxonomic tree including node categories that are siblings in the domain-specific taxonomic tree and node categories sharing an ancestor-descendant relationship of the domain-specific taxonomic tree;
identifying the labeled category clusters that satisfy the coherency condition, wherein the coherency condition is satisfied by a category cluster having all cluster members semantically matched to node categories in the same unique coherent set of the domain-specific taxonomic tree; and
inserting the label of each of the identified category clusters into the topic set for the domain, responsive to identifying the labeled category clusters that satisfy the coherency condition.

13. The one or more tangible processor-readable storage media devices of claim 12 wherein the domain-specific taxonomic tree includes multiple unique coherent sets, each unique coherent set of the domain-specific taxonomic tree including node categories that are siblings in the domain-specific taxonomic tree and node categories sharing an ancestor-descendant relationship of the domain-specific taxonomic tree, and wherein the evaluating operation comprises:
identifying semantic matches between each cluster member of each labeled category cluster of the set and node categories of the domain-specific taxonomic tree.

14. The one or more tangible processor-readable storage media devices of claim 12 wherein the evaluating operation further comprises:
embedding the domain-specific textual data as phrase vectors in a multidimensional vector space; and
generating the set of category clusters from the domain-specific textual data by clustering the phrase vectors into phrase clusters based on a similarity condition, the set of category clusters being selected from the phrase clusters.

15. The one or more tangible processor-readable storage media devices of claim 12 wherein the process further comprises:
generating a different set of category clusters from the domain-specific textual data;
labeling each category cluster of the different set with a label;
evaluating the labeled category clusters of the different set against the domain-specific taxonomic tree based on the coherency condition;
identifying the labeled category clusters of the different set that satisfy the coherency condition; and
inserting the label of each of the identified category clusters of the different set into the topic set for the domain, responsive to identifying the labeled category clusters that satisfy the coherency condition.

16. The one or more tangible processor-readable storage media devices of claim 15 wherein the set of category clusters and the different set of category clusters are generated using a different clustering parameter value.

17. The method of claim 1, wherein the coherency condition is satisfied by the labeled category clusters having an ancestor-descendent relationship within the domain-specific taxonomic tree.

18. The method of claim 1, wherein the coherency condition is satisfied by the labeled category clusters being at the same level of hierarchy within the domain-specific taxonomic tree.

\* \* \* \* \*